US012321447B1

(12) United States Patent
Melchy et al.

(10) Patent No.: US 12,321,447 B1
(45) Date of Patent: Jun. 3, 2025

(54) SYSTEM AND METHOD FOR OPTIMIZING AUTHENTICATION WORKFLOWS, RISK SCORING, AND DECISION POINTS

(71) Applicant: Jumio Corporation, Palo Alto, CA (US)

(72) Inventors: Alix Melchy, Montreal (CA); Jesus Armando Ordorica de la Torre, Montreal (CA); Yanying Chen, Austin, TX (US)

(73) Assignee: Jumio Corporation, Sunnyvale, CA (US)

( * ) Notice: Subject to any disclaimer, the term of this patent is extended or adjusted under 35 U.S.C. 154(b) by 185 days.

(21) Appl. No.: 17/941,343

(22) Filed: Sep. 9, 2022

(51) Int. Cl.
*G06F 21/00* (2013.01)
*G06F 21/31* (2013.01)
*G06F 21/55* (2013.01)
*G06F 21/64* (2013.01)
*G06N 20/00* (2019.01)

(52) U.S. Cl.
CPC ............ *G06F 21/552* (2013.01); *G06F 21/31* (2013.01); *G06F 21/645* (2013.01); *G06N 20/00* (2019.01); *G06F 2221/034* (2013.01)

(58) Field of Classification Search
CPC ...... G06F 21/31; G06F 21/552; G06F 21/645; G06F 2221/034; G06N 20/00; H04L 63/08; H04W 12/06
See application file for complete search history.

(56) References Cited

U.S. PATENT DOCUMENTS

| | | | | |
|---|---|---|---|---|
| 2016/0148201 | A1* | 5/2016 | Kadaster ............ | G06Q 20/4015 705/44 |
| 2017/0300911 | A1* | 10/2017 | Alnajem ............ | G06Q 20/4014 |
| 2018/0309752 | A1* | 10/2018 | Villavicencio ...... | H04L 63/1433 |
| 2023/0140918 | A1* | 5/2023 | Saxena .............. | G06Q 10/0635 705/7.27 |

* cited by examiner

*Primary Examiner* — Joseph P Hirl
*Assistant Examiner* — Chi D Nguy
(74) *Attorney, Agent, or Firm* — Patent Law Works LLP

(57) ABSTRACT

The disclosure includes a system and method for optimizing the use of third-party data sources in an authentication system have workflow in which different third party data sources may be accessed to perform verification tests. The risk profile of individual customers may be taken into account, as well as the costs associated with a different third part data sources. In some implementations an order of a workflow and its decision points are optimized.

20 Claims, 7 Drawing Sheets

SYSTEM AND METHOD FOR OPTIMIZING AUTHENTICATION WORKFLOWS, RISK SCORING, AND DECISION POINTS

BACKGROUND

Many entities have a vested interest in identifying individuals. For example, financial institutions may be interested in identifying customers to thwart malfeasance including, but not limited to, fraud, identity theft, money laundering, etc.

However, there are a variety of problems that arise in authenticating users using a machine learning based authentication workflow.

SUMMARY

An apparatus, system, method, and computer program product is disclosed that implements a workflow for authenticating an identity of a user. Decisions are made whether to continue or determine the workflow based on various consideration, including the costs for accessing third party data sources.

An example of a computer implemented method includes generating a workflow for authenticating an identity of a user and detecting identify fraud, the workflow organized into a sequence of decision points for performing identity verification tests requiring third party data sources incurring a charge. An aggregate risk score is generated that is updated as the workflow progresses through the sequence of decision points. A determination is made at each successive decision point whether to continue or terminate the workflow based on whether the aggregate risk score is within a desired range and whether total costs for accessing third party data sources is within a budget consideration. The method reaches a termination point in the workflow and generates an authentication recommendation.

In one implementation, the aggregate risk score comprises a confidence level.

In one implementation, the aggregate risk score may include a cost of false positives and a cost of a false negatives.

In one implementation, the aggregate risk score includes the total cost for accessing their party data source and the budget consideration.

In one implementation, there is a pre-selected threshold value of the aggregate risk score for determining whether to continue or terminate a workflow.

In one implementation, determining whether to continue or terminate a workflow is based on a statistical decision making technique to discriminate between combinations of factors associated with high quality authentication decisions and low quality authentication decisions.

In one implementation, generating the workflow includes training a machine learning model to implement a configuration of a workflow that optimizes the order of the workflow order and a number of decision points to reduce third party data access costs to authenticate a user for a selected quality level of the authentication.

In one implementation, training the machine learning model includes training a set of mini-models each trained with a different number of variable, with the accuracy and confidence of each mini-model being computed.

In one implementation, training the machine learning model includes performing statistical simulations and using heuristics to determine an optimal order and number of rules to optimize the workflow.

In one implementation the authentication recommendation includes one or more of an acceptance, a denial, and an escalation for human review.

Other implementations of one or more of these aspects include corresponding systems, apparatus, and computer programs, configured to perform the actions of the methods, encoded on computer storage devices.

These and other implementations may each optionally include one or more of the following features.

It should be understood, however, that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

Implementations of the present disclosure are related to systems and methods for identity authentication. In some implementations, this includes using risk scoring to determine whether or not to access third party data sources to perform additional verification tests. An aggregate risk score may be generated at decision points to take into account factors such as a confidence score. In some implementations, the aggregate risk score also takes into account costs of false positives and false negatives. A decision to determine whether or not to perform an additional verification test also includes the costs for accessing additional third party data sources, current total aggregated costs, and budget consideration for incurring third party data source costs. In some implementations, the order of the workflow and the number of decisions for performing verification tests requiring third party data is optimized.

Figure 1:
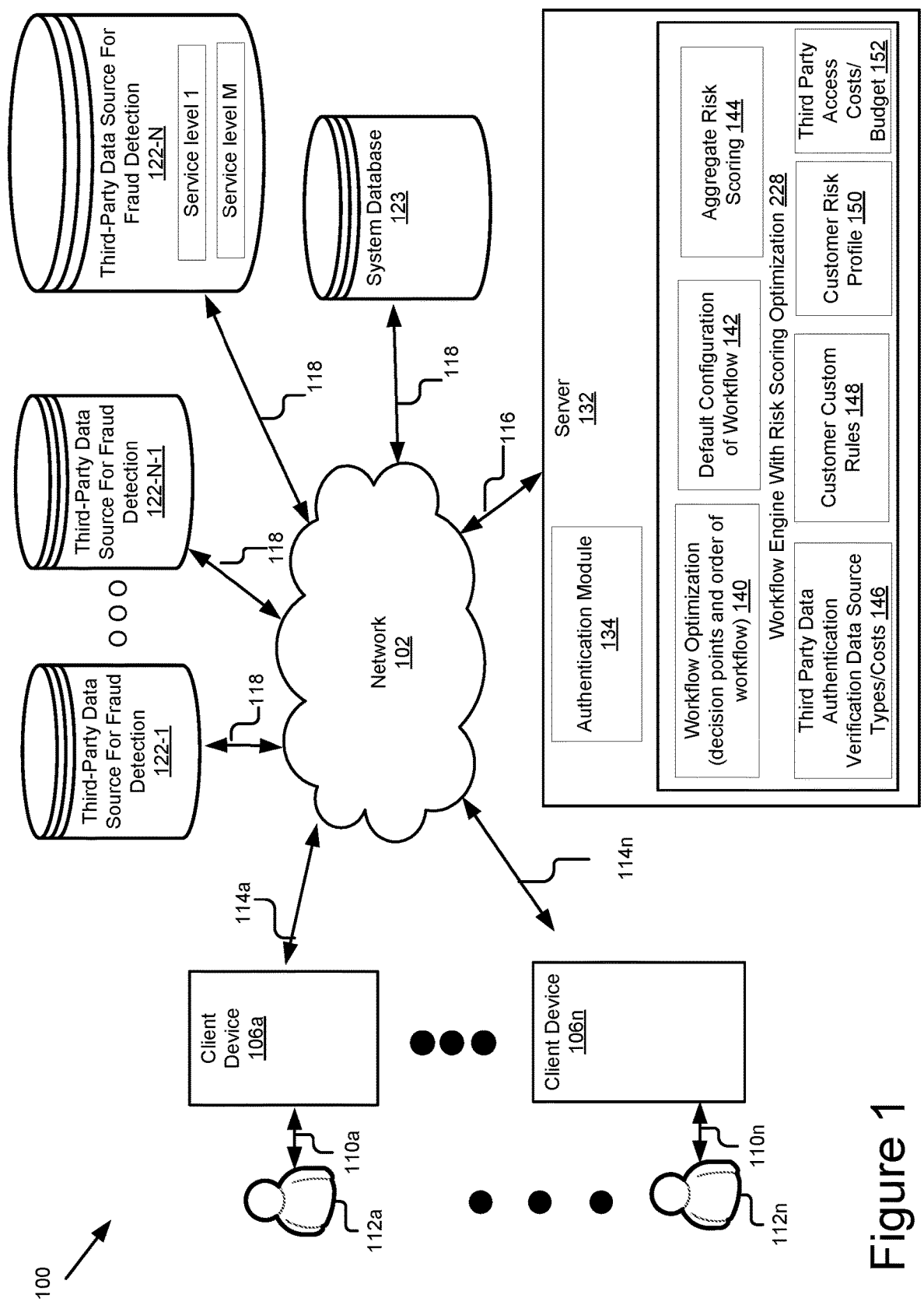
FIG. 1 illustrates a block diagram of an example system for an authentication workflow in accordance with some implementations.

FIG. 1 is a block diagram of an example identity authentication system 100 in accordance with an implementation. As depicted, the system 100 includes a server 132, client devices 106a and 106n, and third-party data sources 122-1 to 122-N coupled for electronic communication via a network 102. The client devices 106a or 106n may occasionally be referred to herein individually as a client device 106 or collectively as client devices 106.

The identity authentication system 100 verifies the identity of a human user to an entity desiring to verify the identity of the user, such as authenticating the identity of the user to an entity such as an online merchant, a financial services organization, a health care organization, etc. An authentication judgment is based on various types of information submitted by the user.

As an example, a user 112 may interact with a client device 106. The user 112 may be asked to submit various types of information to aid in authenticating the user. As a few of many possible examples, the user may be requested to provide information regarding a government-issued photo identification, such as a passport or driver's license. This may include, for example, requesting the user 112 to provide information from the photo identification and/or submitting a photo of the photo identification. The user may also, in some cases, be requested to submit biometric data such as photo, a video clip, a live photo, or a live video clip of themselves. The user may also be required to submit their full legal name, date of birth, a handwriting sample, residence address, email address, phone number, previous residence addresses, places of employment, education, social security number, annual salary, credit card number, etc. Depending on implementation details, additional information on the Internet connection and client device may be acquired, such as an IP address, browser type, etc.

The identity authentication system 100 may access a variety of different third party data sources 122. There may be an arbitrary positive number, N, of different third-party data sources that could be accessed, including government data sources and private data sources. Also, one or more individual third party data sources may have different service levels (e.g., different tiers or options for data and/or data services that can be accessed). Accessing additional sources of information for verification signals can increase the accuracy of the authentication process in a statistical sense, but at a greater cost for accessing additional third party data sources.

Each third-party data source 122 may include a non-transitory memory that stores data and provides access to the data stored therein via network 102. In some implementations, the third-party data source 122 may include a database management system (DBMS). For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

Depending on the implementation, a third-party data source 122 may be private or public (e.g., government entity). In some implementations, the third-party data source 122 is associated with, or represents, one or more services. Examples of services include, but are not limited to, biometric services, identification verification, watch list services, communication services, location services, device identification services, membership services, etc. As some additional examples, there are third party data sources that provide information address verification APIs, phone verification APIs, email verification APIs, driver's license number verification API, etc. There are also third party data sources 132 that perform verification tests for a set of user identity attributes.

Examples of biometric services include, but are not limited to, fingerprint verification, voice recognition, facial recognition, liveness detection, facial image-based age estimator, retina or iris verification, DNA or RNA verification. Examples of identification services include, but are not limited to, identification authentication services, driver's license divisions, and passport offices. Examples of watch list services include, but are not limited to, a terrorist watchlist, a criminal watch list, and a sanctioned individual list. Examples of communications services include, but are not limited to, email hosts, internet service providers, cell providers, mobile data network, email age determiners, and phone number age determiners. Examples of location services include, but are not limited to, physical location services, and network identification services. Physical location services identify a physical location associated with one or more of a user 112 and the client device 106, e.g., to determine whether the location of the client device 106 is near the user's 112 listed residential address. Examples of physical location services include, but are not limited to, GPS, GLONASS, Google Maps, Apple Maps, etc.). Network location services may identify a network location (e.g., an IP address, LAN, VPN, etc.) associated with a user's client device 106. Examples of device identification services include, but are not limited to, databases including one or more of MAC addresses, electronic serial numbers, and device types, which may be provided by a client device's manufacturer or another third party. Examples of membership services include, but are not limited to, employer identification services, employers, businesses, social networks, etc.

In some implementations, a third party data service may receive a first set of one or more attributes and provide a second set of one or more attributes. For example, a communication service may receive an e-mail address (i.e., a first user attribute) and provide an age of that email address, or the associated account (i.e., a second user attribute).

In authenticating a user 112, there is a workflow of work steps. In the workflow, there are one or more authentication verification tests that can be performed using a third party data source by, for example, using an API call. But an API call to third party data source 122 has an associated charge when the third party data source is accessed.

Different individual customers (the entities interested in identifying an individual are customers of the identify authentication system 100) may have different budgets for authentication and different risk profiles, such as different costs for a false positive (falsely authenticating a fraudster) versus a false negative (not authenticating a potential customer and thus losing a transaction and potential future business from the customer). In an individual workflow, there are potential decision points for making a decision whether or not to 1) continue the workflow and access additional third party data source to perform additional verification tests; or 2) terminate the workflow and avoid incurring additional third party data source charges.

Additional Details of Example System

Although two client devices 106 are shown in FIG. 1, it should be understood that there may be any number of client devices 106. It should be understood that the system 100 depicted in FIG. 1 is provided by way of example, and the system 100 and/or further systems contemplated by this present disclosure may include additional and/or fewer components, may combine components and/or divide one or more of the components into additional components, etc. For example, the system 100 may include any number of client devices 106, networks 102, third-party data sources 122, or servers 132.

A client device 106 is a computing device that includes a processor, a memory, and network communication capabilities (e.g., a communication unit). The client device 106 is coupled for electronic communication to the network 102, as illustrated by signal line 114, and may be accessed by a user 112 as illustrated by line 110. In some implementations, the client device 106 may send and receive data to and from other entities of the system 100 (e.g., a server 132). Examples of client devices 106 may include, but are not limited to, mobile phones (e.g., feature phones, smart phones, etc.), tablets, laptops, desktops, netbooks, portable media players, personal digital assistants, etc.

The network 102 may be a conventional type, wired and/or wireless, and may have numerous different configurations including a star configuration, token ring configuration, or other configurations. For example, the network 102 may include one or more local area networks (LAN), wide area networks (WAN) (e.g., the Internet), personal area networks (PAN), public networks, private networks, virtual networks, virtual private networks, peer-to-peer networks, near field networks (e.g., Bluetooth®, NFC, etc.), cellular (e.g., 4G or 5G), and/or other interconnected data paths across which multiple devices may communicate.

The server 132 is a computing device that includes a hardware and/or virtual server that includes a processor, a memory, and network communication capabilities (e.g., a communication unit). The server 132 may be communicatively coupled to the network 102, as indicated by signal line 116. The third-party data source 132 may be communicatively coupled to the network 102, as indicated by signal line 118. In some implementations, the server 132 may send and receive data to and from other entities of the system 100 (e.g., one or more client devices 106 and/or one or more third-party data sources 122).

Authentication, Risk Scoring, Workflows, and Decision Points

Generally speaking, there may be some types of verification tests that can be performed that do not incur third-party data source charges. For example, there may be a system database 123 that includes proprietary data collected over time that may be used for fraud detection, such as data regarding previous fraudsters detected or patterns of behavior of previous fraudsters. The overall system (or optional components thereof) may also perform verification tests that do not require third party data, such as liveness detection (detecting whether a live human being is submitting information from a client device 106, matching photos in a photo identification with a photo taken of the user, etc.).

In some implementations, risk scoring is used to optimize the portion of a workflow associated with accessing third party data sources 122 that result in a charge for each data access. Accessing a larger number of different verification signals will tend to improve statistical factors regarding the overall quality of authentication process, such a confidence level and the costs of false positives and false negatives, but at an increased cost for the cumulative third party data source accesses.

The server 132 may include an authentication module 134 to authenticate individual users 112. Server 132 includes an instance of a workflow engine 228. The workflow engine 228 includes one or more modules to aid in making decisions regarding accessing third party data sources 122 for performing verification tests for authenticating individual users 112.

In some implementations, the workflow engine 228 supports risk scoring optimizations of the workflow. A customer risk profile module 150 stores information about customer risk profiles for individual customers, where by way of example, an individual customer profile may include attributes such as a minimum confidence level for authenticating a user, information related to the costs of false positive and false negative rates to determine desired maximum false positive rates and false negative rates. Information on customer budget considerations for accessing third party data sources may also be included as part of the customer risk profile.

In some implementation, customers can provide custom rules 148 for optimizing a workflow. For example, in some implementations, a customer may be provided with recommendations and options on the workflow the customer may select from.

Information on third party data source types/costs may be stored in module 146. For example, information on current costs, types, and characteristics of different third party data sources may be stored.

An aggregate risk scoring engine 144 may be provided to generate and update an aggregate risk score as additional risk verification tests are performed. To authenticate an individual user, it may require accessing 1, 2, 3 . . . . K different third party data sources, where K is an integer, with the aggregate risk score updated as additional third party data sources are accessed and additional verification tests performed. The aggregate risk score may be used to determine when to stop performing additional verification tests that incur additional third party data source charges. That is, if the aggregate risk score is within a certain range, the authentication result is acceptable, and the workflow can be terminated.

The risk score may be implemented in different ways to provide information indicative of different identity fraud risk buckets, such as a low, medium, or high signal generated from the available risk information as one example. For example, as one options there may be a High/Medium/Low confidence that the user is who he/she purports to be. The risk may also incorporate other information such as the costs of false positive and false negatives. The risk score may also be implemented as a single score (e.g., a number on a scale of 1 to 10), a set of scores, or represent a set of statistical metrics (e.g., a confidence level). Some other examples of what a risk score can be include one or more of: a fraud risk by association (e.g., a user associated with one or several entities that is involved in fraudulent behaviors: this may include a device, people, businesses, or other legal entities), a risk due to inconsistent data (e.g., an address doesn't exist), and a risk due to patterns of transactions.

A budget consideration may include a fixed maximum budget for total (aggregate) third party data accesses for authenticating a user. However, the budget consideration could be a budget formula, such as a budget formula setting forth conditions of the workflow for which a variance in the budget is permitted. The aggregate third party data access charges (and cost for accessing additional third part data source) may be compared with the budget consideration as a consideration for terminating the workflow.

Alternatively, the, aggregate risk score could account for aggregate third party data access charges and budgetary considerations. That is, the aggregate risk score could, in theory, be expanded to account for all the information needed to make decisions regarding whether or not to terminate the workflow or continue performing additional verification tests. For example, a budgetary constraint can be part of a constrained optimization approach (e.g., under a false negative rate and budget constraints reducing the false positive rate).

A default configuration of the workflow 142 may be stored. For example, a customer may select from a menu of different options to configure a workflow. There may be certain basic types of workflow for certain types of industries. However, a workflow optimization engine 140 may be provided to optimize the order of the workflow and the decision points in the workflow that require accessing particular third party data sources.

A workflow optimization engine 140 determines decision points and an order of the workflow. In particular, in some implementations it analyzes aspects of the workflow that rely on third party data sources and determines optimum sequences of the workflow order and decision points.

Server Implementation Example

Figure 2:
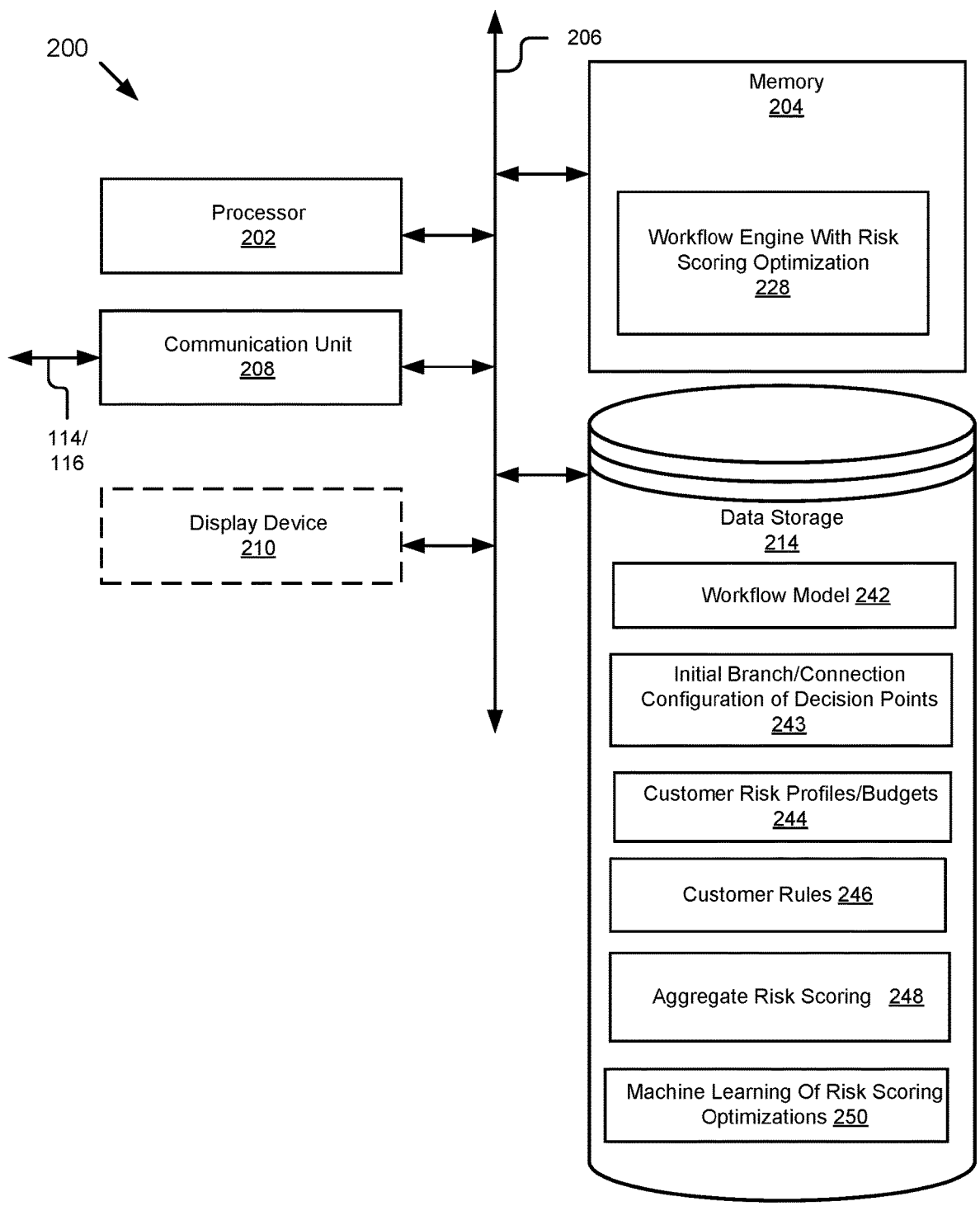
FIG. 2 illustrates a block diagram of an example computing device in accordance with some implementations.

FIG. 2 is a block diagram of an example computing device 200 including an instance of the workflow engine 228 in accordance with some implementations. As previously discussed, the authentication module 134 and workflow engine 228 may be implemented on a server, or alternatively on other types of computing devices. In the illustrated example, the computing device 200 includes a processor 202, a memory 204, a communication unit 208, a display device 210, and a data storage 214. In one implementation, the computing device 200 is a server 132, the memory 204 stores the workflow engine 228, and the communication unit 208 is communicatively coupled to the network 102 via signal line 116.

The processor 202 may execute software instructions by performing various input/output, logical, and/or mathematical operations. The processor 202 may have various computing architectures to process data signals including, for example, a complex instruction set computer (CISC) architecture, a reduced instruction set computer (RISC) architecture, and/or an architecture implementing a combination of instruction sets. The processor 202 may be physical and/or virtual, and may include a single processing unit or a plurality of processing units and/or cores. In some implementations, the processor 202 may be capable of generating and providing electronic display signals to a display device, supporting the display of images, capturing and transmitting images, and performing complex tasks and determinations. In some implementations, the processor 202 may be coupled to the memory 204 via the bus 206 to access data and instructions therefrom and store data therein. The bus 206 may couple the processor 202 to the other components of the computing device 200 including, for example, the memory 204, the communication unit 208.

The memory 204 is a non-transitory memory that stores data for providing the functionality described herein. The memory 204 may store and provide access to data for the other components of the computing device 200. The memory 204 may be included in a single computing device or distributed among a plurality of computing devices. In some implementations, the memory 204 may store instructions and/or data that may be executed by the processor 202. The instructions and/or data may include code for performing the techniques described herein. For example, in one implementation, the memory 204 may store an instance of one or more of the workflow engine 228. The memory 204 is also capable of storing other instructions and data, including, for example, an operating system, hardware drivers, other software applications, databases, etc. The memory 204 may be coupled to the bus 206 for communication with the processor 202 and the other components of the computing device 200.

The memory 204 may include one or more non-transitory computer-usable (e.g., readable, writeable) device, a static random access memory (SRAM) device, a dynamic random access memory (DRAM) device, an embedded memory device, a discrete memory device (e.g., a PROM, FPROM, ROM), a hard disk drive, an optical disk drive (CD, DVD, Blu-ray™, etc.) mediums, which can be any tangible apparatus or device that can contain, store, communicate, or transport instructions, data, computer programs, software, code, routines, etc., for processing by or in connection with the processor 202. In some implementations, the memory 204 may include one or more of volatile memory and non-volatile memory. It should be understood that the memory 204 may be a single device or may include multiple types of devices and configurations.

The memory 204 stores the workflow engine 228. The workflow engine 228 may include software and/or logic for generating, applying, and taking action based on a workflow. The workflow engine 228 is coupled to operate in conjunction with the processor 202 to perform the features and functionality described herein.

In some implementations, the computing device 200 is a server 132. A processor 202 may perform at least some of the features and functionality described herein. The communication unit 208 is hardware for receiving and transmitting data by linking the processor 202 to the network 102 and other processing systems. The communication unit 208 receives data and transmits the data via the network 102. The communication unit 208 is coupled to bus 206. In one implementation, the communication unit 208 may include a port for direct physical connection to the network 102 or to another communication channel. For example, the computing device 200 may be the server 132, and the communication unit 208 may include an RJ45 port or similar port for wired communication with the network 102. In another implementation, the communication unit 208 may include a wireless transceiver (not shown) for exchanging data with the network 102 or any other communication channel using one or more wireless communication methods, such as IEEE 802.11, IEEE 802.16, Bluetooth® or another suitable wireless communication method.

In yet another implementation, the communication unit 208 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another implementation, the communication unit 208 may include a wired port and a wireless transceiver. The communication unit 208 also provides other connections to the network 102 for distribution of files and/or media objects using standard network protocols such as TCP/IP, HTTP, HTTPS, and SMTP as will be understood to those skilled in the art.

The display device 210 is a conventional type such as a liquid crystal display (LCD), light emitting diode (LED), touchscreen, or any other similarly equipped display device, screen, or monitor. The display device 210 represents any device equipped to display electronic images and data as described herein.

The data storage 214 is a non-transitory memory that stores data and provides access to the data stored therein. The data storage 214 may include one or more non-transitory computer-readable mediums for storing the data. In some implementations, the data storage 214 may be incorporated with the memory 204 or may be distinct therefrom. The data storage 214 may be a dynamic random-access memory (DRAM) device, a static random-access memory (SRAM) device, flash memory, or some other memory devices. In some implementations, the data storage 214 may include a database management system (DBMS) operable on the computing device 200. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations. In other implementations, the data storage 214 also may include a non-volatile memory or similar permanent storage device and media including a hard disk drive, a CD ROM device, a DVD ROM device, a DVD RAM device, a DVD RW device, a flash memory device, or some other mass storage device for storing information on a more permanent basis. The data storage 214 is communicatively coupled to the bus 206.

The data storage 214 may store, among other data model(s) 242, an initial (or default) configuration of a workflow 243 in terms of branch and connection points of workflow, customer risk profiles 244, customer risk profile 244, custom rules 246, aggregate risk scoring metrics/rules, 248, and machine learning of risk scoring optimizations 250.

Workflow Engine Example

Figure 3:
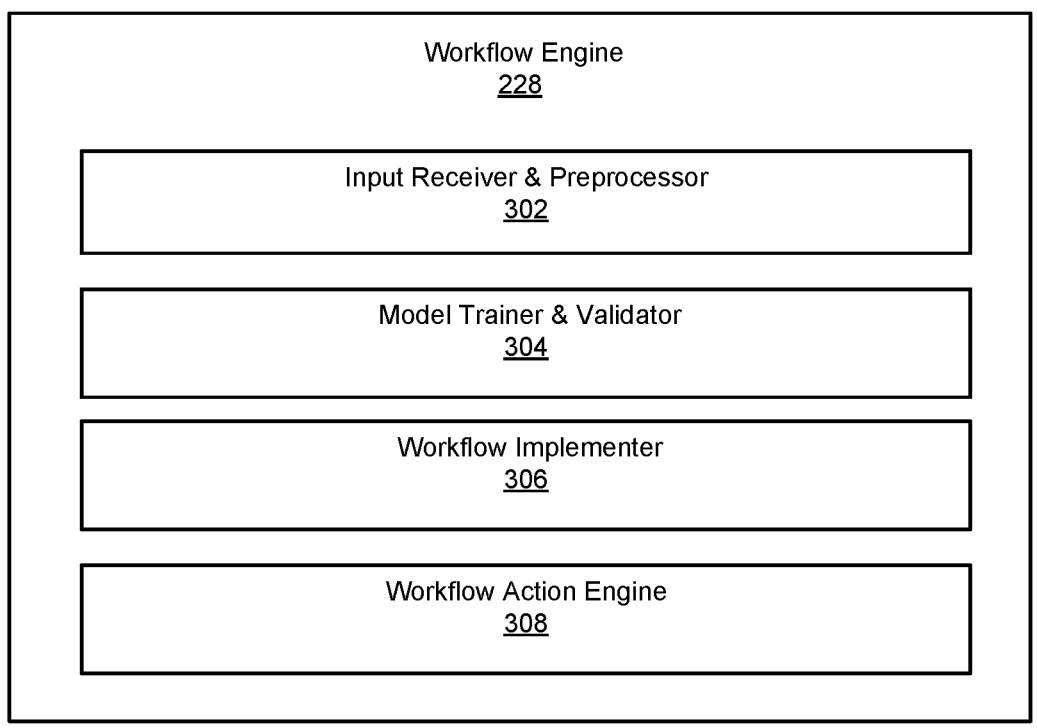
FIG. 3 illustrates a block diagram of an example of a workflow engine in accordance with some implementations.

Referring now to FIG. 3, a block diagram of an example workflow engine 228 is illustrated in accordance with one implementation. As illustrated in FIG. 3, workflow engine 228 includes a input receiver and preprocessor 302, model trainer and validator 304, a workflow implementer 306, and a workflow action engine 308.

The input receiver and preprocessor 302, or its subcomponents, may include software and/or logic for receiving and preprocessing input data for use by the dynamic model trainer and validator 304. For example, in implementations where the model 242 trained by model trainer and validator 304 uses a supervised, or semi-supervised, algorithm, the input data may include outcome data. Outcome data may describe an outcome of a workflow and/or audit of an outcome of a workflow. Examples of an outcome of a workflow may include, but is not limited to, labels such as accepted, denied, escalated, escalated and denied, escalated and accepted, etc. Examples of an outcome of an audit may include, but are not limited to false positives indicating an improper denial, or a false negative indicating an improper acceptance.

In some implementations, the input receiver and preprocessor 302 divides the input data into a set of training data and a set of validation data. In some implementations, the input receiver and preprocessor 302 is communicatively coupled to provide the training data set and validation data set to the dynamic model trainer and validator 304. For example, the input receiver and preprocessor 302 is communicatively coupled to send the training data set and validation data set to the dynamic model trainer and validator 304. In another implementation, the input receiver and preprocessor 302 stores the training data set and validation data set (e.g., in memory 204, data storage 214, or other storage device) and the model trainer and validator 304 retrieves the training data set and validation data set therefrom.

In some implementations, the input receiver and preprocessor 302, or its subcomponents, may be coupled to obtain input data from one or more services. For example, the input receiver and preprocessor 302 may receive data from one or more of third party data sources. In some implementations, the input receiver and preprocessor 302 may be coupled to obtain outcome data from workflow implementer 306 and workflow action engine 308.

The input receiver and preprocessor 302, or its subcomponents, may include software and/or logic for receiving and preprocessing input data for use by the dynamic workflow implementer 306. For example, in some implementations, a request to perform the workflow is received by the workflow engine 228. After the request is received, i.e., during runtime, which may also be referred to as deployment, the input receiver and preprocessor 302 receives input data from one or more of user 112, a client devices 106, and a one or more service, which may be used by the dynamic workflow implementer 306 to perform the one or more work steps thereof. In some implementations, the input receiver and preprocessor 302, or its subcomponents, may be communicatively coupled to one or more client devices 106, to obtain input data from one or more of the users 112, the client devices 106, and the one or more services.

The dynamic model trainer and validator 304 may include software and/or logic for training, validating, and optimizing one or more dynamic models 242. The model trainer and validator 304 trains one or more dynamic models 242. Depending on the implementations, the dynamic model 242 may be attribute-based, work step-based, or a combination thereof. In some implementations, a work step-based dynamic model 242 is a work flow. For example, when the model 242 is a work step-based decision tree, the nodes (e.g., root, branch, or leaf) may be associated with or a work step. In some implementations, a validated and optimized work step-based dynamic model 242 represent a workflow that, when implemented by the workflow implementer 306, efficiently and accurately verifies the customer (e.g., user 112a).

In some implementations, a dynamic model 242 may be attribute-based, and the attributes are mapped to one or more work steps, by the model trainer and validator 304, based on attribute-to-workflow-step map. For example, when the dynamic model 242 is an attribute-based decision tree, a node (e.g., root, branch, or leaf) may be associated with or based on an attribute. In some implementations, a validated and optimized attribute-based model 242 may represent a set of attributes that, when obtained by a dynamic workflow implemented by the dynamic workflow implementer 306 and applied in the modeled order, accurately and efficiently verifies the customer (e.g., user 112a).

Depending on the implementation, the dynamic workflow model 242, the workflow based on the workflow model 242, or both may be dynamic in regard to a composition (e.g., what work steps and/or attributes are used), an order (e.g., which attributes to receive in what order, an order of the work steps performed), and services used.

In some implementations, the model trainer and validator 304 generates a workflow based on the model 242. For example, in some implementations, the model trainer and validator 304 generates, validates, and optimizes a work step-based model 242 that is a dynamic workflow model. In another example, in some implementations, the model trainer and validator 404 generates an attribute-based dynamic model 242 and maps the attributes to one or more work steps, using the attribute-to-work step map, to generate a work flow, which may be validated and optimized. In another example, in some implementations, the dynamic model trainer and validator 304 generates an attribute-based dynamic model 242, which may be validated and optimized, then maps the attributes to one or more work steps, using the attribute-to-work step map.

The dynamic model trainer and validator 304 is communicatively coupled to provide a dynamic workflow. For example, the model trainer and validator 304 is communicatively coupled to provide the dynamic workflow to the dynamic workflow implementer 306. In another example, dynamic model trainer and validator 304 is communicatively coupled to the memory 204, or data storage 214, to store the dynamic workflow for retrieval by the workflow implementer 306.

The dynamic workflow implementer 306 may include software and/or logic for implementing a dynamic workflow. For example, the workflow implementer 306 receives input data during runtime, or deployment, and applies the dynamic workflow. In some implementations, applying, or implementing, the workflow may include performing one or more work steps comprising the dynamic workflow, causing one or more work steps comprising the dynamic workflow to be performed (e.g., requesting performance by a service and a return of a result), or a combination thereof.

Depending on the implementations, the dynamic workflow implementer 306 may contribute to the dynamism of the dynamic workflow implemented by one or more of modifying an order of work steps (e.g., obtaining email age after government identification verification); using a different (e.g., random) service when multiple, similar services are available; modifying a work step (e.g., to still obtain the same user attributes, but via a different request or mechanism) based on the attribute-to-workflow-step map, etc.

The result output by the workflow implementer 306 during deployment may vary based on the implementation and the instance. In some implementations, the output of the dynamic workflow implementer 306 is associated with a likelihood the present customer/user is who he/she purports to be. Examples of outputs include, but are not limited to, a binary (e.g., True, or 1, for verified/passed and False, or 0, for unverified/failed, etc.), a numeric probability (e.g., a decimal between 0 and 1 or a numeral between 1 and 100, etc.), a classification (e.g., a High/Medium/Low confidence that the user is who he/she purports to be; a recommended action approve/deny/escalate; a user class such as "celebrity" or "politically exposed person"), etc.

The workflow implementer 306 is communicatively coupled to provide an output generated by implementing the dynamic workflow on incoming input data. For example, the dynamic workflow implementer 306 is communicatively coupled to provide the output of the workflow to the dynamic workflow action engine 308. In another example, dynamic workflow implementer 306 is communicatively coupled to the memory 204, or data storage 214, to store the output of the dynamic workflow for retrieval by the workflow action engine 308.

The workflow action engine 308 may include software and/or logic for taking one or more actions based on the dynamic workflow. In some implementations, the dynamic workflow action engine 308 takes one or more actions based on an output of the dynamic workflow. Examples of actions taken based on an output of the workflow include, but are not limited to, an approval, a denial, and an escalation.

Examples of approvals include, but are not limited to, allowing or performing the transaction, account creation, login, or other action that prompted application of the dynamic workflow to ensure compliance. Examples of denials include, but are not limited to, rejecting or denying the transaction, account creation, login, or other action that prompted application of the dynamic workflow to ensure compliance. Examples of escalation include, but are not limited to, performing additional verification, requesting or applying secondary or human review, reporting the activity and failure, such as to an authority or governing body.

In some implementations, the workflow action engine 308 takes one or more actions by outputting the dynamic workflow or a profile (e.g., Bank A's customer onboarding profile). In some implementations, the action taken by the dynamic workflow action engine 308 includes outputting one or more metrics. In some implementations, the metrics may describe results of the workflow, how results of the dynamic workflow compare to other dynamic workflows, or both. Examples of metrics describing results of the dynamic workflow may include, but are not limited to, a total number of one or more of acceptances, denials, escalations, false positives, and false negatives; a velocity or acceleration of one or more of acceptances, denials, escalations, false positives, and false negatives; an average cost per instance of applying the dynamic workflow, or a work step therein, or for a service usage, or per acceptance, or per denial; velocity or acceleration of a cost associated with one or more of an acceptance, denials, escalation, false positive, and false negative; average time to complete workflow or a work step thereof, which may describe a service's turnaround time.

How results of the dynamic workflow compare to results of other dynamic workflows may describe how the dynamic workflow associated with one entity (e.g., Bank A) compares to the dynamic workflows associated with other entities. In some implementations, the entity and other entities may belong to a common peer group. Comparison among a peer group may provide a more meaningful comparison. For example, one may expect more denials from a dynamic workflow implemented for a large and widely recognized crypto-currency exchange than a local credit union, as the former may be a more likely target for fraud, money laundering, or other malfeasance. Accordingly, a comparison between the two may not be as informative as a comparison of the local credit union to other local credit unions, and the crypto-currency exchange to other crypto-currency exchanges. Depending on the implementation, one or more of the metrics describing results of the dynamic workflow may be compared. The comparisons may directly, or indirectly, represent standard, or best, practices, and how the dynamic workflow implemented by the present entity or tenant compares to others (e.g., whether it lags or leads by X standard deviations).

The workflow action engine 308 is communicatively coupled to output the one or more actions. For example, the dynamic workflow action engine 308 is communicatively coupled to provide an approval, or denial, to one or more of the client devices 106 and an application (not shown) requesting verification. In another example, the dynamic workflow action engine 308 is communicatively coupled to provide an escalation, e.g., to an authority or regulatory body (not shown). In yet another example, the workflow action engine 308 is communicatively coupled to present the one or more metrics to a user (e.g., an administrative user of Bank A) on a client device 106. In still another example, the dynamic workflow action engine 308 is communicatively coupled to the input receiver and preprocessor 302 to provide the one or more actions and associated inputs as training data for retraining (e.g., batch, mini-batch, or online retraining) of the dynamic model 242.

The varieties of supervised, semi-supervised, and unsupervised machine learning algorithms that may be used, by the model trainer, to train the dynamic model 242 are so numerous as to defy a complete list. Example algorithms include, but are not limited to, a tree-based algorithm, such as a decision tree, a gradient boosted tree, boosted stumps, a random forest; a support vector machine; a neural network, such as a recurrent neural network or convolutional neural network; long short-term memory; transformer; logistic regression (with regularization), linear regression (with regularization); stacking; a Markov model; a Markov chain; deep learning; and others. Additionally, depending on the implementation, the model trainer 602 may train more than one algorithm to generate a dynamic model 242 that is an ensemble model.

In some implementations, a model 242 may be attribute-based, and the attributes are mapped to one or more work steps. For example, when the dynamic model 242 is an attribute-based decision tree, a node (e.g., root, branch, or leaf) may be associated with or based on an attribute. In some implementations, a validated and optimizes attribute-based dynamic model 242 may represent a set of attributes most likely to accurately and efficiently verify the customer (e.g., user 112a).

In some implementations, the accuracy optimization may be weighted based on outcome errors. For example, when a false positive (i.e., incorrectly rejecting a user) is associated with a potential loss of $500 to the entity (e.g., a bank or credit card issuer), but a false negative (i.e., incorrectly approving a user/fraudster) is typically associated with an average loss of $20,000, a model 242 that has a lower raw accuracy score, when errors are made they are false positives may be crowned the champion over a model 242 with higher raw accuracy, but a greater incidence of false negative errors.

Additionally, the system may also take into account applicable national, state, or industry-specific regulations. For example, entities (e.g., financial institutions, such as banks) must increasingly comply with the laws and regulations of an increasing number of jurisdictions (e.g., mores states and/or more countries), as customers and/or transactions involving a customer may be increasingly likely to cross jurisdictional boundaries.

Example Optimization Techniques

There are several considerations for optimizing the use of external third party data sources. There is the consideration of configuring the workflow and third party data sources to perform different verification tests. As the workflow progresses in a sequence of work steps, there are decision points for performing additional verification tests that access third party data sources.

Figure 4:
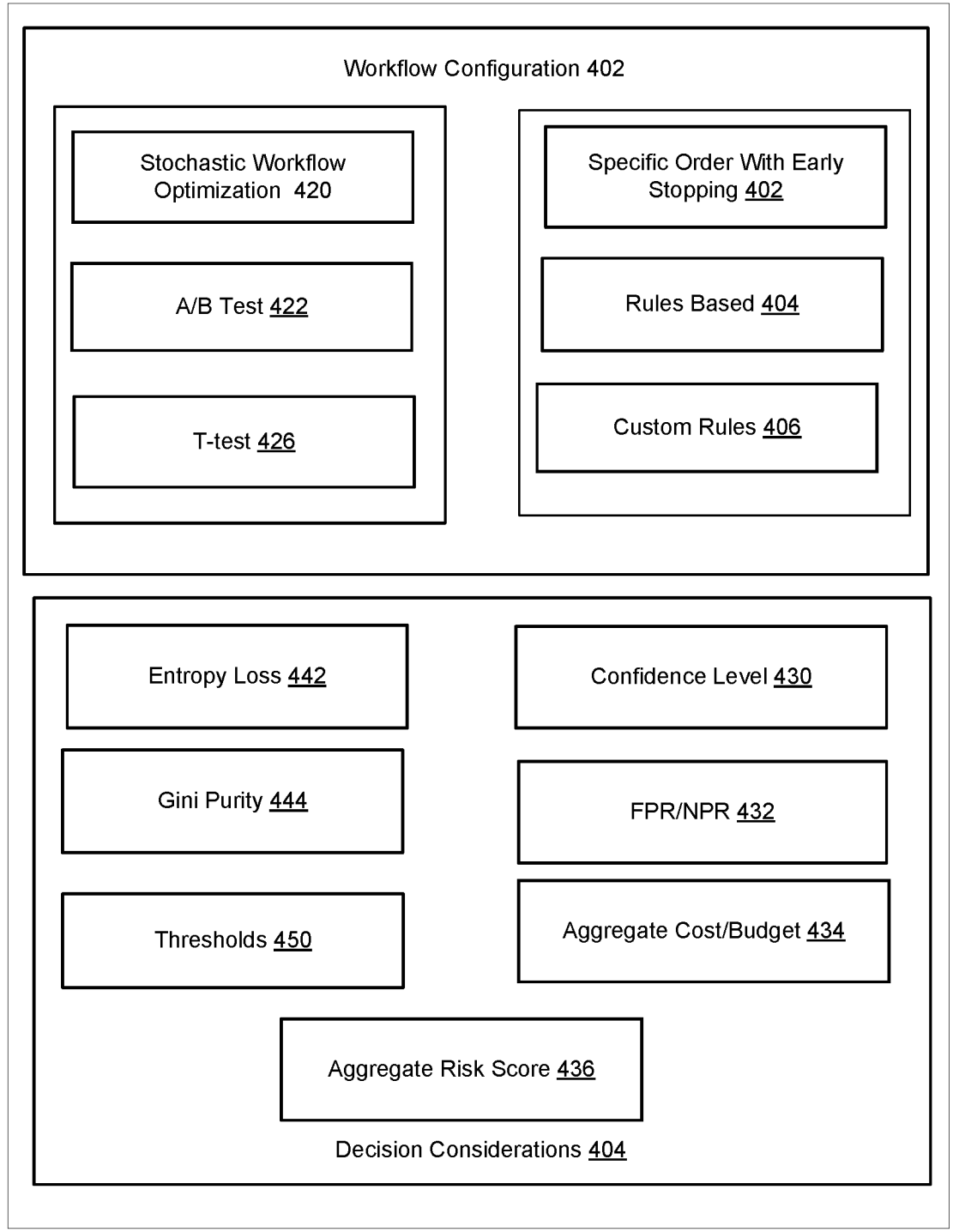
FIG. 4 illustrates a block diagram illustrating some examples of work flow and risk scoring optimizations in accordance with some implementations.

Referring to FIG. 4, the configuration of a workflow 402 can be set in several different ways. One approach is a rule base approach 404. A rule based approach 404 may, for example, be based on domain specific rules for specific industries, custom settings 404 based on customer preferences, and include rules based on applicable national or state regulations (e.g., banking regulations). The workflow may, for example, progress in a specific order with early stopping 402. Alternatively a stochastic ordering technique 420 may be used to configure the workflow based on statistical simulations. For example, statistical simulations may use heuristics (e.g., machine learning heuristics) to determine an optimal order and number of rules to optimize the workflow. Some examples include using t-testing 426 (statistical hypothesis testing) to select workflows. A/B testing 422 may also be used. A/B testing is a technique for performing randomized experiments with two variants, A and B. Using A/B testing and t-testing can be used to feed statistical significance and practical significance signals into machine learning optimization of the workflows. Other examples include a generalization of A/B test with a multi-armed bandit test. Yet another approach is a recommendation-inspired one based on the cohorts defined above in earlier examples regarding a workflow and its ordering recommended based on what is seen among similar customers.

As an illustrative but non-limiting example, suppose there are eight different third party data sources that could be accessed at different decision points. The order of the decision points and the verification test performed at that decision point may be rule-based and have a fixed order. So an original set of decision points might have a fixed order and number (e.g., 1, 2, 3, 4, 5, 6, 7, 8).

However, an original set of decision points (e.g., 1, 2, 3, 4, 5, 6, 7, 8) might, using statistical optimization techniques, be reduced to a smaller number of decision points in a different sequence (e.g., 2, 1, 4, 5, 6). That is, stochastic ordering may be used to optimize the order and number of verification rules and associated third party data accesses to achieve a desired level of confidence and quality of decision.

There may also be hybrid approaches, using a mixture of rules (e.g., client rules regarding "must have" verification checks) and optimization of the order and number of other verification tests in the workflow. That is, there may be a mixture of custom rules and machine learning rules.

The decision process at each decision point may be based on an aggregate risk score of a risk scoring model. The risk scoring model takes into account factors relevant to customers such as a confidence level (based on all verification tests that have been performed by the decision point), and may include other aspects of a customer's risk profile, such as the costs of false positives, the costs of false negatives, and budgetary considerations, such as the aggregate total cost of third party data resources accessed by the decision point, the cost of accessing N additional third party data source to perform an additional test, and budgetary considerations. In some implementations, user-specific factors or transaction-specific factors may be included. For example, the cost of a false negative may depend on the specific operation the end user (the customer's customer) is performing. In some implementations, the cost of a false positive that may depend on the profile of the end user (end users with higher lifetime value yield a higher cost of false positive). Transaction-specific factors may be specified by the customer. User-specific factors may be specified by the customer as well.

A decision is made at each decision point whether or not to 1) continue performing additional verification tests requiring additional accesses to third party data sources or 2) to terminate the workflow (which may include outputting a recommendation or a summary of results).

The decision making process at each decision point may be based on threshold values associated with the aggregate risk score (or component factors thereof). Machine learning classification techniques decision tree algorithms may be used to aid in discriminating between buckets of high fraud rate and low rate. For example, techniques such as entropy loss and Gini Purity may be used in some implementations.

As illustrated in FIG. 4, some of the considerations for making decisions at decision points include a confidence level 430, the costs of false positives and false negatives 432, aggregate costs/budget constraints for third party data accesses 434, and considerations for distinguishing whether or not the overall quality of verification is sufficient using for example, entropy loss 442, Gini Purity 444, or thresholds 450 to distinguish different combinations of confidence level and other metrics. In some implementations an aggregate risk score 436 is generated at each decision point.

Example Methods

Figure 5:
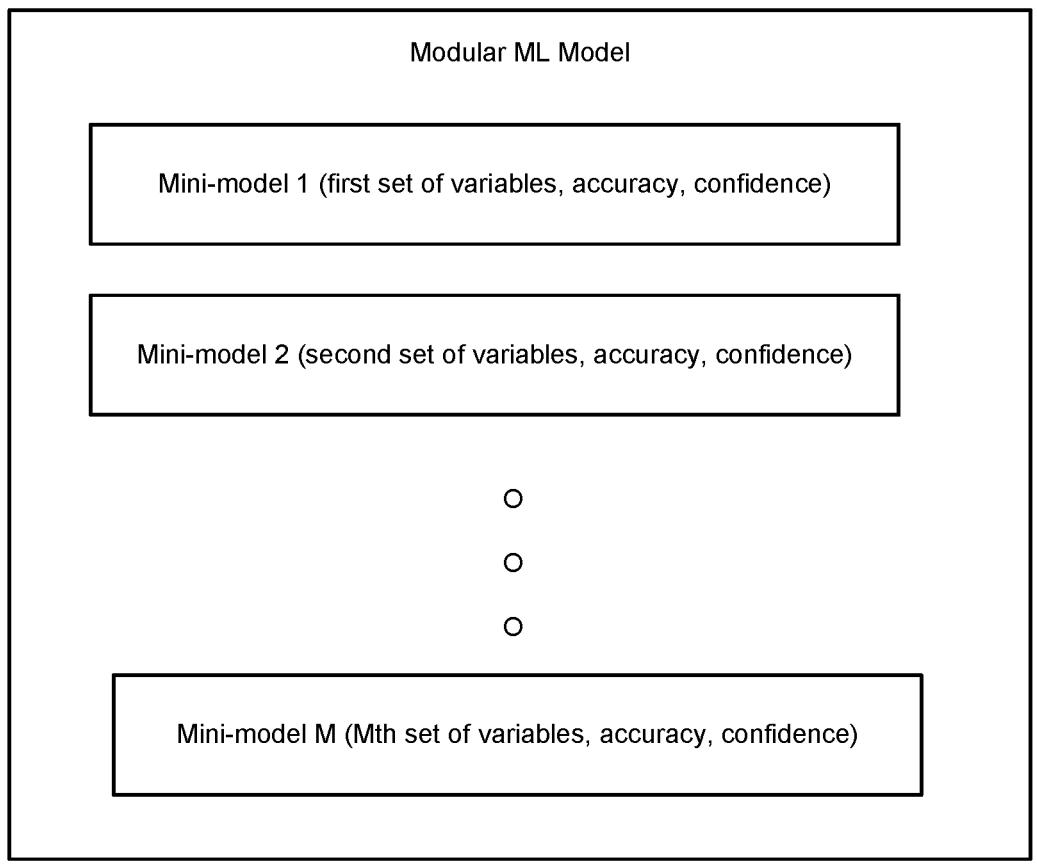
FIG. 5 illustrates a modular machine learning model in accordance with some implementations.
Figure 6:
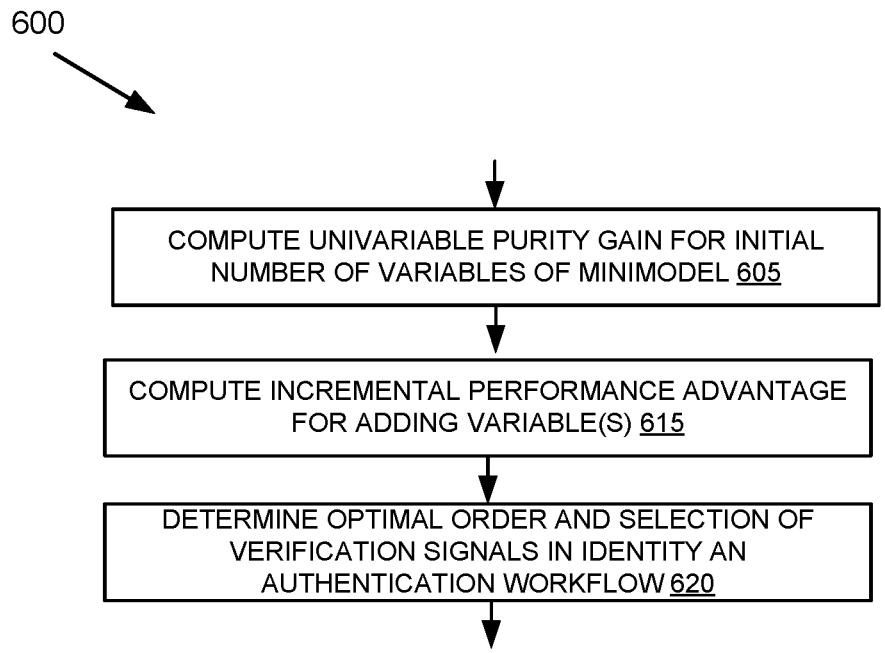
FIG. 6 is a flowchart illustrating a method of determining an optimal order and selection of verification signals in an authentication workflow in accordance with an implementation.

Referring to FIG. 5, in one implementation, the machine learning model for the workflow is implemented in a modular form with mini-models trained with a different number of variables, with the accuracy and confidence of each mini-model being computed. As an illustrative (but non-limiting example), suppose there are 10 variables. Referring to the flowchart 600 of FIG. 6, in block 605, the univariate purity gain of each variable is computed. In block 615, the incremental performance advantage of adding each of the remaining nine variables in different orders is computed. In block 620, an optimum order and selection of verification signals in an authentication work flow is determined. Thus, different numbers of total variables used and the order they are used can be compared. In one implementation, recommendations could be provided to a customer in a menu to choose options providing an expected quality of authentication decision for desired range of costs.

Figure 7:
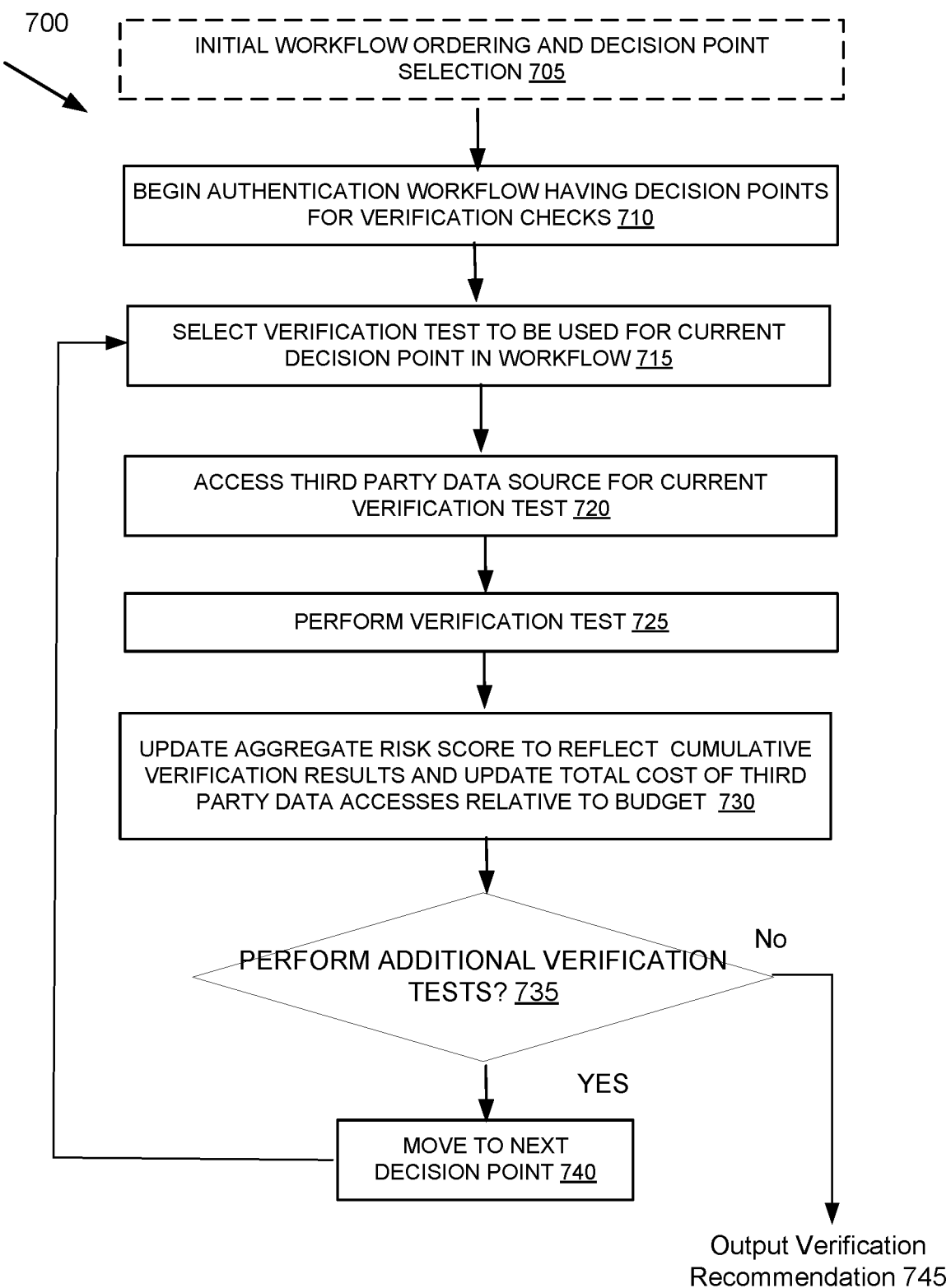
FIG. 7 illustrates a flowchart of a method of implementing a workflow in accordance with some implementations.

FIG. 7 illustrates a flowchart of a method in accordance with an implementation. An initial workflow with a workflow ordering and decision points is provided in block 700. For example, the decision points may be associated with connection points or branch points of the workflow. The workflow may, as previously discussed, in some cases be optimized in regards to the use of third party data sources that incur a charge when accessed. In block 710, the authentication workflow begins, with the workflow having decision points for performing verification checks that require access to third party data sources that would, when accessed, incur a charge. In block 715, a verification test is selected for the current decision point in the workflow. By way of example but not limitation, the workflow might begin with verification tests using lower-cost or medium cost third party data sources. In block 720, the corresponding third party data source for the current verification test is accessed and in block 725 the verification test is performed.

In block 730, an aggregate risk score is updated to reflect the cumulative verification results. This includes the total cost of the third party data accesses. A confidence level (or other statistical metric of quality), many be calculated based on the cumulative verification results. Other statistical metrics may also be computed, such as an estimated FPR/NPR.

In block 735, a decision is made whether or not to perform additional verification tests. This may include taking into account the total costs (with respect to a customer's budget), the confidence level, and other statistical metrics. It may also include taking account a customer's risk profile in terms of the respective costs of a false positive and a false negative. If the decision is made to continue performing additional verification tests, then in block 740, the method loops back to block 715. If a decision is made to stop performing additional verification tests in block 735, the workflow is terminated and a verification recommendation 745 is output. This may include, for example, an acceptance recommendation, a denial recommendation, or an escalation to human intervention recommendation. Alternatively, an aggregate risk score could be output.

Customer preferences may be taking into account in various ways. For example, some customers may require some verification tests to be mandatory. That is, customer preferences may identify some verification check as being mandatory, "must-have" checks. There may also be segmentation of end-user or customers due to, for example, national and state regulations that influence what sorts of verification tests are to be performed. Also, the relative costs of false positives and negatives may be customized for individual customers.

Other Considerations

It should be understood that the above-described examples are provided by way of illustration and not limitation and that numerous additional use cases are contemplated and encompassed by the present disclosure. In the above description, for purposes of explanation, numerous specific details are set forth in order to provide a thorough understanding of the present disclosure. However, it should be understood that the technology described herein may be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

Reference in the specification to "one implementation" or "an implementation" or "some implementations" means that a particular feature, structure, or characteristic described in connection with the implementation is included in at least one implementation. The appearances of the phrase "in some implementations" in various places in the specification are not necessarily all referring to the same implementations.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As should be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies, engines, and other aspects of the disclosure can be implemented as software, hardware, firmware, or any combination of the foregoing. Also, wherever an element, an example of which is a module, of the specification is implemented as software, the element can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A computer implemented method comprising:
generating a workflow for authenticating an identity of a user and detecting identify fraud, the workflow organized into a sequence of decision points for performing a sequence of different identity verification tests each generating a different verification signal requiring third party data sources incurring a different charge, wherein a statistical factor regarding an overall quality of an authentication process increases based on cumulative verification signals;
generating an aggregate risk score that is updated as the workflow progresses through the sequence of decision points and the different identity verification tests;
determining cumulative total costs as the workflow progresses through the sequence of decision points and incurs cost for each completed identity verification tests;
determining at each successive decision point whether to continue or terminate the workflow based on whether the aggregate risk score is within a desired range and whether total costs for accessing third party data sources is within a budget consideration; and
reaching a termination point in the workflow and generating an authentication recommendation.

2. The computer implemented method of claim 1, wherein the aggregate risk score comprise a confidence level.

3. The computer implemented method of claim 2, wherein the aggregate risk score comprises a cost of false positives and a cost of a false negatives.

4. The computer implemented method of claim 2, wherein the aggregate risk score includes the total cost for accessing third party data source and the budget consideration.

5. The computer implemented method of claim 1, wherein the determining at each successive decision point whether to continue or terminate the workflow is based on a preselected threshold value of the aggregate risk score.

6. The computer implemented method of claim 1, wherein the determining at each successive decision point whether to continue or terminate the workflow is based on a statistical decision making technique to discriminate between combinations of factors associated with high quality authentication decisions and low quality authentication decisions.

7. The computer implemented method of claim 1, wherein the recommendation includes one or more of an acceptance, a denial, and an escalation for human review.

8. A computer implemented method comprising:
generating a workflow for authenticating an identity of a user and detecting identify fraud, the workflow organized into a sequence of decision points for performing a different identity verification tests each generating a different verification signal requiring third party data sources incurring a different charge, wherein a statistical factor regarding an overall quality of an authentication process increases based on cumulative verification signals;
generating an aggregate risk score that is updated as the workflow progresses through the sequence of decision points and different identity verification tests;
determining cumulative total costs as the workflow progresses through the sequence of decision points and incurs cost for each completed identity verification test;
determining at each successive decision point whether to continue or terminate the workflow based on whether the aggregate risk score is within a desired range and whether total costs for accessing third party data sources is within a budget consideration;
reaching a termination point in the workflow and generating an authentication recommendation; and
wherein generating the workflow comprises training a machine learning model to implement a configuration of a workflow that optimizes the workflow order and a number of decision points to reduce third party data access costs to authenticate a user for a selected quality level of the authentication.

9. The computer implemented method of claim 8, wherein training the machine learning model comprises training a set of mini-models each trained with a different number of variables, with an accuracy and confidence of each mini-model being computed.

10. The computer implemented method of claim 8, wherein training the machine learning model comprises performing statistical simulations and using heuristics to determine an optimal order and number of rules to optimize the workflow.

11. A system comprising:
a processor; and
a memory, the memory storing instructions that, when executed by the processor, cause the system to:
generate a workflow for authenticating an identity of a user and detecting identify fraud, the workflow organized into a sequence of decision points for performing a sequence of different identity verification tests each generating a different verification signal requiring third party data sources incurring a different charge, wherein a statistical factor regarding an overall quality of an authentication process increases based on cumulative verification signals;
generate an aggregate risk score that is updated as the workflow progresses through the sequence of decision points and the different identity verification tests;
determine cumulative total costs as the workflow progresses through the sequence of decision points and incurs cost for each completed identity verification test;
determine at each successive decision point whether to continue or terminate the workflow based on whether the aggregate risk score is within a desired range and whether total costs for accessing third party data sources is within a budget consideration; and
reach a termination point in the workflow and generating an authentication recommendation.

12. The system of claim 11, wherein the aggregate risk score comprise a confidence level.

13. The system of claim 12, wherein the aggregate risk score comprises a cost of false positives and a cost of a false negatives.

14. The system of claim 12, wherein the aggregate risk score includes the total coast for accessing third party data source and the budget consideration.

15. The system of claim 11, wherein the system determines at each successive decision point whether to continue or terminate the workflow based on a pre-selected threshold value of the aggregate risk score.

16. The system of claim 11, wherein the system determines at each successive decision point whether to continue or terminate the workflow based on a statistical decision making technique to discriminate between combinations of factors associated with high quality authentication decisions and low quality authentication decisions.

17. The system of claim 11, wherein generating the workflow comprises training a machine learning model to implement a configuration of a workflow that optimizes the order of the workflow order and a number of decision points to reduce third party data access costs to authenticate a user for a selected quality level of the authentication.

18. The system of claim 17, wherein training the machine learning model comprises training a set of mini-models each trained with a different number of variables, with the accuracy and confidence of each mini-model being computed.

19. The system of claim 17 wherein training the machine learning model comprises performing statistical simulations and using heuristics to determine an optimal order and number of rules to optimize the workflow.

20. The system of claim 11, wherein the authentication recommendation includes one or more of an acceptance, a denial, and an escalation for human review.

* * * * *